3,303,954
BONDING FOAMED POLYSTYRENE TO METAL
Hermas N. Beaudet, West Acton, and David G. Greenlie, Weston, Mass., assignors to W. R. Grace & Co., Cambridge, Mass., a corporation of Connecticut
No Drawing. Filed Mar. 30, 1962, Ser. No. 183,710
7 Claims. (Cl. 215—39)

This invention relates to a method for bonding foamed polystyrene to metals having a protective organic coating and to products produced thereby. In one particular aspect, it relates to a method for bonding foamed polystyrene to the internal surface of the crown closures having a protective organic coating, and to the products produced thereby.

The industrial applications of many metals makes it necessary to protect them against corrosion and abrasion by applying upon their surfaces some form of protective barrier. In many instances, this barrier is a thin, tough, adherent organic coating applied to flat sheet steel to be subsequently fabricated into cans, closures, screw caps, panels, toys and other articles. These coatings are generally non-blocking, i.e. the coated metal surfaces slip readily over each other, at temperatures below 125° F.

The coating may be formed by any conventional means as, for example, from lacquers, varnishes or aqueous polymeric dispersions. A lacquer consists essentially of a film-forming resin and a volatile solvent with the principal film-forming ingredients being cellulose nitrate, ethyl cellulose, chlorinated rubber and the vinyl resins. Varnishes are unpigmented, oil-base paints composed of a solvent and binders of the oleoresinous or synthetic type. The oleoresinous type of binder is generally comprised of drying oils in combination with natural or synthetic resins, chlorinated rubber, etc., whereas the synthetic type is normally comprised of alkyds and combinations of alkyds. Aqueous polymeric dispersions include generally emulsion polymerized dispersions of vinyl chloride-vinylidene chloride and styrene-butadiene copolymers, as well as acrylic and vinyl acetate polymers and copolymers.

Conventionally, an adhesive is used to bond foamed polystyrene to a metal having a protective organic coating. Placement of the adhesive requires separate and additional steps, and often the adhesive deteriorates after long storage times resulting in loosening or loss of the adherent polystyrene which remains unchanged in form.

The present invention provides an economical and practical method for bonding foamed polystyrene to a metal normally having an organic coating without the use of an adhesive to provide a wide variety of products. According to the present invention, a bond is formed between the foamed polystyrene and the coating which is greater than the tensile strength of the foamed polymer.

In brief, this invention comprises roughening the smooth surface of one side of foamed polystyrene, heating the organic coating disposed on a metal surface to a temperature in the range of 150 to 400° F., and pressing the roughened surface of the polystyrene against the heated coating.

The type of organic coating applied to a metal is determined largely by the intended use of the metal. For example, oleoresinous varnishes and vinyl resin lacquers are most frequently used for coating cans and closures. A specific example of a conventional lacquer for coating the internal surface of closures comprises a mixture of 80 percent of a vinyl chloride-vinyl acetate copolymer (87 percent vinyl chloride), together with 20 percent of an oleoresinous modifier, specifically tung oil modified phenyl phenol-formaldehyde resin, dissolved in an organic solvent, specifically 70 percent xylene and 30 percent isophorone. The lacquer has 20 percent solids content. The solvents, of course, are removed after the lacquer is applied to the metal.

Film weights of the coating also vary with the intended use of the metal and need only be sufficient to cause the foamed polystyrene to adhere to the metal. For example, the internally coated surfaces of crowns may have a film weight in the range of about 2.5 to 4.5 milligrams per square inch.

Foamed polystyrene is characterized by a smooth surface which makes bonding of the polymer to other materials difficult. By roughening the surface of the foam, ruptured surface cells are created to form a multiplicity of bond sites. These sites complement each other to provide an overall improved bond. The particular means employed to roughen the surface is not important, all that is necessary is the elimination of the smooth surface which is characteristic of foamed polystyrene. Simple abrasion is quite effective and may be performed by conventional means such as by grinding or rotary cutting.

The particular temperatures employed to effect the bond may vary from about 150 to 400° F. with the preferred temperature being about 250° F. At temperatures below 150° F. a weak adhesive bond is produced whereas excessively high temperatures, i.e. about 500° F., may have a deteriorating effect on the polystyrene. As the temperature of the coating is increased from 150° F., the dwell time of pressurized contact required to bond the polystyrene to the heated coating is correspondingly shortened.

The pressure applied to the polystyrene to effect adhesion to the coating is not especially critical and is determined largely by the temperature of the coating and, to some extent, by its composition. As the temperature is increased, correspondingly lower pressures are needed to effect a satisfactory bond. Typical pressures are from light contact pressures to about 70 p.s.i. At the preferred temperature of 250° F., a pressure as low as 20 p.s.i. has worked satisfactorily. At a given temperature, however, harder coatings such as those formed from oleoresinous varnishes will require slightly higher pressures, or longer dwell times of pressurized contact, as compared to softer coatings such as those formed from vinyl resin lacquers. Lower pressures are generally preferred because of simpler operating conditions and the avoidance of undue compression of the foamed polymer.

Any conventional means can be used to apply pressure to the polystyrene to press it against the heated coating. For example, coated panels, such as refrigerator panels, may be heated to a temperature within the operating range specified herein, and the foamed polymer may be manually pressed against the coating. Where the polystyrene is being adhered to the internal surface of a crown, a plunger of the type conventionally employed in the crown cap art can be used.

The polystyrene can be formed in any conventional manner as by beating air or other gas into a melt, by dissolving a solvent in the polymer which is volatile at the extrusion temperature, by using a heat decomposable finely divided solid gas generating agent in a liquid system (melt, dispersion, solution and the like) or by forcing a normally gaseous agent into a melt of the polymer under pressure and extruding, with the latter being preferred. See, for example, United States Patents Nos. 2,669,751, 2,941,964, and 2,950,261.

The essential characteristics of the foamed polymer suitable for use in this invention may be defined as follows:

Initial density—1.5 to 10 pounds per cubic foot.
Compressed density—20 to 40 pounds per cubic foot.
Compressive yield strength at initial density—50 to 180 pounds per square inch.

Ultimate tensile at initial density—100 to 300 pounds per square inch.
Void volume—70 to 98 percent, preferably 80 to 95 percent.
Average size of cells—2 to 10 mils.
Heat distortion temperatures—160 to 200° F. (Determined in accordance with ASTM D 703–56T.)

The foamed polystyrene preferably has cells or voids which are independent, i.e. not interconnecting, and the cell walls form a continuous structure which prevents flow of gas and liquid from cell to cell. The polymer may be copolymerized with minor amounts of other monomers, such as divinyl benzene, to improve its properties. Dyes, plasticizers, and fillers can be used if desired.

The invention will be further illustrated by the following examples:

*Example I*

Seals for crown closures were made which comprised a disc of foamed polystyrene having an annular ring of an elastomeric material adhesively secured to its circumference. In this particular type of seal the foamed polystyrene disc serves to position the outer elastomeric ring in the proper sealing position between the cap and the lip of a container and constrains the ring during the capping operation when the outer sealing ring is being compressed and deformed.

These seals were made as follows:
Foamed polystyrene cores were prepared by cutting blocks about 12 inches long from commercially available foamed polystyrene plank (Dow HD–1 Styrofoam) and turning the blocks on a lathe to form cylindrical rods having a diameter of 0.90 inch. The foam had an uncompressed density of 4.5 pounds per cubic foot, an ultimate tensile of 185 pounds per square inch, and a compressive yield strength of 140 pounds per square inch at the uncompressed density.

Two types of elastomers were adhesively secured to these rods to produce seals, designated for convenience as Types A and B. Type A seal was fabricated by first coating a rod with a polyvinyl chloride adhesive (Geon 450×3 latex), drying at 180° F. and then wrapping a cast sheet of polyvinyl chloride plastisol around the adhesively-coated rod. Each sheet (10 inches by 3⅛ inches and having a thickness of 0.021 inch) was cast at 360° F. and applied to the rods at 300 to 350° F., after being heated in an oven by rolling the sheet around the polystyrene core followed by water quenching. The plastisol was comprised primarily of polyvinyl chloride resin and dioctyl phthalate.

The Type B seal was made by applying a 50 mil thick dip coat of a rubber latex compound to each rod (previously coated with an adhesive) and drying at 130° F. The seals were cured by heating for 14 hours at 150° F. The rubber latex compound was a natural rubber latex modified with large amounts of barytes and asbestine.

The seals were sliced from each of the rods using a rotary knife (i.e. a meat slicer) and varied in thickness from 48 to 110 mils, with most being about 62 mils.

Standard short-skirted crowns internally coated with a vinyl resin lacquer ("S1325–F Gold Modified Vinyl Lacquer") were used to form closures.

The crowns were placed in a star wheel and the top panels were heated with a gas flame to a temperature of about 280° F. A seal was inserted into each of the heated crowns and a pressure of about 20 p.s.i. was applied to the foamed polystyrene disc of each seal by means of a spring for 4 seconds. The crowns were then allowed to cool to room temperature.

To test the strength of the bond between the polystyrene disc of the seal and the crown, force was applied to the periphery of each of the seals with a blunt edged knife to dislodge the seal. In every instance, the bond was stronger than the tensile strength of the foamed polystyrene disc.

*Example II*

Crown closures were prepared as described in Example I except that the top panels of the crowns were heated to a temperature of 400° F. and pressure was applied to the polystyrene disc of the seal for a fraction of a second.

The bond between the disc and the crown was tested as described in Example I. In every instance the bond was stronger that the tear strength of the polystyrene disc.

*Example III*

Standard short-skirted crowns internally coated with a lacquer comprised of a mixture of 60 percent phenol-formaldehyde resin ("Bakelite BKR 2620"), 28 percent of a vinyl chloride-vinyl acetate copolymer (13 percent vinyl acetate) ("Bakelite VMCH") and 12 percent of epoxy resin ("Bakelite EKR 2002") were used to form closures with seals prepared as described in Example I.

The crowns were placed successively in a star wheel and the top panels were heated with a gas flame to temperatures ranging from 150 to 250° F. A seal was inserted into each heated crown and pressures of about 20 to 40 p.s.i. were applied to the foamed polystyrene disc of each seal by means of a spring for about 4 seconds. The crowns were then allowed to cool to room temperature.

The bond between the polystyrene disc and the crown was tested as described in Example I. In every instance the bond was stronger that the tear strength of the polymer disc.

*Example IV*

The procedure described in Example III was repeated except that the coating on the internal surface of the crowns was comprised of a mixture of 25 percent phenol formaldehyde resin ("Bakelite BKR 2620"), 25 percent of a vinyl chloride-vinyl acetate copolymer (13 percent vinyl acetate) ("Bakelite VMCH") and 50 percent of titanium dioxide.

The bond between the polystyrene disc and the crown was tested as described in Example I. In every instance the bond was stronger that the tear strength of the polystyrene disc.

*Example V*

The procedure described in Example I was repeated except that the coating on the internal surfaces of the crown was comprised essentially of phenol formaldehyde and maleic glyceride resins ("Amberol") modified with tung oil.

The bond between the polystyrene disc and the crown was tested as described in Example I. In every instance the bond was stronger than the tear strength of the polystyrene disc.

*Example VI*

Crown closures were prepared as described in Examples I to V. The closures were placed in a bag which was put into a freezer maintained at −13° F. At the end of 64 hours, the bag was shaken in the freezer for five minutes and then removed and allowed to warm to room temperature.

Examination of the closures showed that the bond was not affected by low temperature abuse.

We claim:
1. A method of bonding foamed polystyrene to a metal having a non-blocking polymeric closure coating formed from a member of the group consisting of varnishes and lacquers, said coating having a film weight in the range of about 2.5 to 4.5 milligrams per square inch, which comprises roughening a surface of the foamed polystyrene by rupturing the surface cells to form a multiplicity of bond sites, heating the coating to a temperature in the range of 150 to 400° F., and pressing the roughened surface of the polystyrene against the heated coating until a bond is effected.

2. The method according to claim 1 wherein the temperature is 250° F.

3. The method according to claim 1 wherein the coating is comprised of 60 percent phenol formaldehyde resin, 28 percent of a vinyl chloride-vinyl acetate copolymer, said copolymer containing 13 percent vinyl acetate, and 12 percent epoxy resin.

4. The method according to claim 1 wherein the coating is comprised of 25 percent phenol formaldehyde resin, 25 percent of a vinyl chloride-vinyl actate copolymer, said copolymer containing 13 percent vinyl acetate, and 50 percent titanium dioxide.

5. A method of bonding a seal comprised of a foamed polystyrene disc having an annular elastomeric ring to the internal surface of a metal crown having a non-blocking polymeric closure coating formed from a member of the group consisting of varnishes and lacquers, said coating having a film weight in the range of 2.5 to 4.5 milligrams per square inch, which comprises roughening a surface of a foamed polystyrene disc by rupturing the surface cells to form a multiplicity of bond sites, heating the coating to a temperature in the range of 150 to 400° F., inserting the seal into the crown and pressing the roughened surface of the polystyrene disc against the heated coating until a bond is effected.

6. An article comprised of a metal having a non-blocking polymeric closure coating formed from a member of the group consisting of varnishes and lacquers, said coating having a film weight in the range of about 2.5 to 4.5 milligrams per square inch on one of its surfaces and foamed polystyrene having a roughened surface of ruptured surface cells bonded directly to the coated metal surface by means of heat and pressure and in the absence of an external adhesive.

7. A crown closure comprising a metal crown having a non-blocking polymeric closure coating formed from a member of the group consisting of varnishes and lacquers, said coating having a film weight in the range of about 2.5 to 4.5 milligrams per square inch, on its internal surface, and a seal comprised of a foamed polystyrene disc having an annular elastomeric ring, said polystyrene disc having a roughened surface of ruptured cells bonded to the coated metal surface by means of heat and pressure and in the absence of an external adhesive.

References Cited by the Examiner

UNITED STATES PATENTS

| | | | |
|---|---|---|---|
| 2,238,681 | 4/1940 | Dorough | 215—40 X |
| 2,510,908 | 6/1950 | Shubert. | |
| 2,521,470 | 9/1950 | Matheson. | |
| 2,787,809 | 4/1957 | Stastny. | |
| 2,823,422 | 2/1958 | Schneider | 215—39 X |
| 2,917,217 | 12/1959 | Sisson. | |
| 2,998,501 | 8/1961 | Edberg et al. | |
| 3,032,826 | 5/1962 | Brillinger | 215—40 X |

OTHER REFERENCES

"Monsanto Plastic Thermoplastic Cements Development Bulletin 1400–2," July 2, 1945, 3 pp.

EARL M. BERGERT, *Primary Examiner.*

C. B. COSBY, *Assistant Examiner.*